United States Patent
Mathrubootham et al.

(10) Patent No.: US 11,757,953 B2
(45) Date of Patent: Sep. 12, 2023

(54) ONLINE COLLABORATION PLATFORM FOR COLLABORATING IN CONTEXT

(71) Applicant: Freshworks Inc., San Bruno, CA (US)

(72) Inventors: Rathnagirish Mathrubootham, Chennai (IN); Smrithi Parameswar, Chennai (IN); Srividya Sriram, Chennai (IN)

(73) Assignee: Freshworks Inc., San Mateo, CA (US)

( * ) Notice: Subject to any disclaimer, the term of this patent is extended or adjusted under 35 U.S.C. 154(b) by 428 days.

(21) Appl. No.: 16/114,408

(22) Filed: Aug. 28, 2018

(65) Prior Publication Data

US 2019/0373029 A1 Dec. 5, 2019

(30) Foreign Application Priority Data

May 29, 2018 (IN) .............................. 201841019994

(51) Int. Cl.
*H04L 65/401* (2022.01)
*G06F 3/04842* (2022.01)
*H04L 51/04* (2022.01)
*G06F 16/903* (2019.01)

(52) U.S. Cl.
CPC ...... *H04L 65/4015* (2013.01); *G06F 3/04842* (2013.01); *G06F 16/903* (2019.01); *H04L 51/04* (2013.01)

(58) Field of Classification Search
CPC ... G06F 16/903; G06F 3/04842; H04L 51/04; H04L 65/4015
See application file for complete search history.

(56) References Cited

U.S. PATENT DOCUMENTS

| | | | | |
|---|---|---|---|---|
| 6,212,548 B1* | 4/2001 | DeSimone | .......... | H04L 12/1813 709/204 |
| 6,346,952 B1* | 2/2002 | Shtivelman | ......... | H04M 3/5191 715/758 |
| 6,630,944 B1* | 10/2003 | Kakuta | .................. | G06Q 10/10 715/758 |
| 7,987,275 B2* | 7/2011 | Shae | .................... | H04L 12/1818 709/227 |
| 8,667,059 B2* | 3/2014 | Singh | ..................... | G06Q 30/02 709/204 |
| 8,725,810 B1* | 5/2014 | Bau | ......................... | H04L 51/04 709/204 |
| 8,892,630 B1* | 11/2014 | Curtis | ................ | G06Q 30/0282 709/203 |

(Continued)

OTHER PUBLICATIONS

Slack Technologies. "A lingering farewell to the username", publicly posted Sep. 27, 2017, 7 pages. (Year: 2017).*

*Primary Examiner* — George C Neurauter, Jr.
(74) *Attorney, Agent, or Firm* — LeonardPatel PC; Sheetal S. Patel; Michael A. Leonard, II

(57) ABSTRACT

To collaborate in context, an online messaging platform is launched for a user to communicate by way of electronic messaging with one or more other users. The online messaging platform is launched in response to a user selecting text. One or more additional users are added to the online messaging platform, when the user tags the one or more additional users. Exchange of electronic messaging is facilitated, via the online messaging platform, between the user and the one or more additional users in regard to the selected text.

21 Claims, 8 Drawing Sheets

(56) References Cited

U.S. PATENT DOCUMENTS

| | | | | |
|---|---|---|---|---|
| 8,903,933 | B1* | 12/2014 | Bellini, III | H04L 29/08837 707/705 |
| 8,965,874 | B1* | 2/2015 | Vassilakis | G06F 16/9535 707/706 |
| 9,178,950 | B2* | 11/2015 | Kansky | H04L 67/22 |
| 9,584,375 | B2* | 2/2017 | Kansky | G06F 3/0481 |
| 9,846,859 | B1* | 12/2017 | Casale | G06F 3/0482 |
| 9,852,399 | B1* | 12/2017 | Casale | G06F 16/245 |
| 10,033,676 | B2* | 7/2018 | Miyamoto | G06F 17/241 |
| 10,038,786 | B2* | 7/2018 | Kannan | H04L 12/1827 |
| 10,079,736 | B2* | 9/2018 | Bellini, III | H04L 41/5074 |
| 10,354,226 | B1* | 7/2019 | Casale | G06F 3/04817 |
| 10,419,372 | B2* | 9/2019 | Kansky | H04L 41/22 |
| 10,594,502 | B1* | 3/2020 | Soroker | H04M 7/006 |
| 10,671,248 | B2* | 6/2020 | Muramoto | G06F 3/04886 |
| 10,680,986 | B1* | 6/2020 | Wu | H04L 51/16 |
| 10,812,539 | B2* | 10/2020 | Chen | H04L 65/1093 |
| 10,999,089 | B1* | 5/2021 | Soroker | H04N 7/147 |
| 11,093,125 | B1* | 8/2021 | van Doorn | G06F 3/04847 |
| 2006/0161851 | A1* | 7/2006 | Chen | H04M 1/72552 715/751 |
| 2007/0174407 | A1* | 7/2007 | Chen | G06Q 10/10 709/207 |
| 2008/0082619 | A1* | 4/2008 | Wanderski | G06Q 10/00 709/207 |
| 2008/0229390 | A1* | 9/2008 | Holm | H04W 4/08 726/3 |
| 2009/0228555 | A1* | 9/2009 | Joviak | G06Q 10/107 709/205 |
| 2009/0254563 | A1* | 10/2009 | Arnold | G06Q 10/107 |
| 2009/0254618 | A1* | 10/2009 | Arnold | G06F 16/951 709/206 |
| 2010/0005402 | A1* | 1/2010 | George | H04L 51/04 715/758 |
| 2010/0017194 | A1* | 1/2010 | Hammer | G06F 17/2785 704/9 |
| 2010/0306185 | A1* | 12/2010 | Smith | G06Q 10/107 707/709 |
| 2011/0231500 | A1* | 9/2011 | Zhu | G06Q 10/107 709/206 |
| 2012/0017149 | A1* | 1/2012 | Lai | H04L 65/1069 715/716 |
| 2012/0159349 | A1* | 6/2012 | Kansky | H04L 41/22 715/752 |
| 2012/0198360 | A1* | 8/2012 | Wanderski | G06Q 10/00 715/758 |
| 2012/0284638 | A1* | 11/2012 | Cutler | G06Q 10/00 715/751 |
| 2012/0323623 | A1* | 12/2012 | Sabharwal | G06Q 10/063112 705/7.14 |
| 2013/0117667 | A1* | 5/2013 | Pallakoff | G06F 16/93 715/273 |
| 2013/0129076 | A1* | 5/2013 | Kannan | H04M 3/5141 379/265.09 |
| 2013/0318533 | A1* | 11/2013 | Aghassipour | G06Q 10/06311 718/103 |
| 2014/0026025 | A1* | 1/2014 | Smith | G06Q 10/101 715/230 |
| 2014/0032254 | A1* | 1/2014 | Della Corte | G06Q 30/016 705/7.14 |
| 2014/0324982 | A1* | 10/2014 | Agrawal | H04L 65/403 709/206 |
| 2015/0025960 | A1* | 1/2015 | Gadamsetty | G06F 3/0482 705/14.44 |
| 2015/0026597 | A1* | 1/2015 | Gadamsetty | H04L 51/046 715/753 |
| 2015/0026604 | A1* | 1/2015 | Mulukuri | H04L 51/32 715/758 |
| 2015/0195220 | A1* | 7/2015 | Hawker | G06F 16/90324 709/206 |
| 2015/0256497 | A1* | 9/2015 | Park | H04W 4/14 709/206 |
| 2016/0043974 | A1* | 2/2016 | Purcell | H04L 51/046 715/758 |
| 2016/0261537 | A1* | 9/2016 | Yang | H04L 12/1818 |
| 2016/0352677 | A1* | 12/2016 | Gordon | H04L 51/36 |
| 2016/0373446 | A1* | 12/2016 | Ball | G06F 16/335 |
| 2017/0180219 | A1* | 6/2017 | Abuelsaad | H04L 41/5074 |
| 2018/0139324 | A1* | 5/2018 | Pearce | H04M 3/493 |
| 2018/0192260 | A1* | 7/2018 | Lee | H04L 51/04 |
| 2019/0141092 | A1* | 5/2019 | Sanchez | H04L 67/26 |
| 2019/0327192 | A1* | 10/2019 | Li | G06F 16/954 |
| 2019/0369828 | A1* | 12/2019 | Kitahashi | G06F 3/0484 |

\* cited by examiner

ONLINE COLLABORATION PLATFORM FOR COLLABORATING IN CONTEXT

CROSS REFERENCE TO RELATED APPLICATION

This application claims the benefit of, and priority, Indian Provisional Patent Application No. 201841019994 filed May 29, 2018. The subject matter of this earlier-filed application is hereby incorporated by reference in its entirety.

FIELD

The present invention relates to online messaging, and more particularly, to an online collaboration platform for messaging.

BACKGROUND

Existing messaging platforms allow users of multiple devices to communicate with one another regardless of the user's location. However, to collaborate (i.e., to work together) by way of existing messaging platforms without losing sight of a given project is virtually non-existent. Let's assume, for example, that a user is developing a webpage or working on an online document. In this example, when the user comes across a problem that requires assistance, the user would be required to transmit a screen shot of the problem or the document to another person by email. The user may also communicate with the other person by way of electronic messaging to resolve the problem. However, the user and the other person is prevented from jointly collaborating by way of an online collaboration platform that presents the issue and facilitates electronic communication.

Similar issues may arise with Internet-based sales or Internet-based helpdesk systems, etc., where the user is required to hand off the project to another person. For example, with existing Internet-based helpdesk systems, there are two types of ticket resolution techniques that are followed when a customer facing agent requires additional information. The first technique is parent child ticketing, and the second technique is ticketing reassignment.

With the first technique, when a ticket is created ("parent ticket"), the parent ticket is assigned to an agent ("primary agent") for response and resolution. If the response of the primary agent is dependent upon inputs from another agent ("secondary agent"), the primary agent creates a task ("child ticket") under the parent ticket and assigns the child ticket to the secondary agent for his or her response and resolution.

That being said, this technique produces a multitude of problems. For example, a child ticket has its own response and resolution times (SLAs) and such SLAs are independent from that of the SLAs of the parent ticket. In another example, when multiple child tickets are created, each child ticket is a task, and therefore, each task has its own SLA. This again is independent of the parent ticket's SLA.

Further, the tasks created through child tickets are independent tasks and are worked in parallel. Therefore, online collaboration between multiple agents is tedious due to independent SLAs for each child ticket as well as the parent ticket. Also, it becomes difficult to keep track of the workflow, which is dependent on tasks that can only be created by the child tickets.

Additionally, the primary agent does not have visibility of the child ticket unless the primary agent is granted access to it. In other words, the primary agent does not receive status updates for the child ticket, and therefore, cannot respond to customer queries in that regard. With restrictions on ticket access, collaboration between the agents handling parent ticket and child tickets is not be possible. Each agent must be an agent in the ticketing system so that he or she can be assigned tasks pertaining to the ticket.

With the second technique, when the primary agent requires inputs from an internal technical team before he or she can respond to a customer request or query, the primary agent needs to reassign the ticket to the relevant technical team. With this technique, a multitude of problems also arise. For example, the primary agent loses ownership of the ticket, and the ticket becomes inaccessible to the primary agent until the ticket is reassigned back to the primary agent. Meanwhile, if a customer follows up with the primary agent regarding the status of the ticket, the primary agent will not receive a status request, nor will the primary agent respond to the customer, since the ticket is not assigned to the primary agent. This results in zero control over the SLAs.

FIG. 1 is related art showing a flow diagram of a conventional online ticket management process 100. In conventional ticket management process 100, Customer electronically communicates with Agent 1 (S102) regarding a ticket. However, as discussed above, when the Agent 1 requires further assistance from a member of the technical team, the ticket is either reassigned from Agent 1 to Agent 2 or a child ticket is created (S104). Further, all electronic communications (S106) between Agent 2 and Agent 3 are one-way communications in so far that Agent 1 has no access. Thus, while Agent 2 and Agent 3 are resolving the issue, Agent 1 is not privy to the electronic communication between Agent 2 and Agent 3 nor does Agent 1 have any access to the ticket or child ticket. Agent 1 only regains access (S108) when Agent 3 communicates with Agent 1 by way of Agent 2 directly, allowing Agent 1 to electronically communicate (S110) with Customer.

Regardless of the technique, with online ticketing, collaboration by way of electronic messaging with other computing devices is difficult. Thus, an alternative technique that allows for collaboration using an online messaging system may be more beneficial.

SUMMARY

Certain embodiments of the present invention may provide solutions to the problems and needs in the art that have not yet been fully identified, appreciated, or solved by current online messaging technologies. For example, some embodiments pertain to an online, real-time collaboration messaging platform.

In an embodiment, a computer-implemented method includes launching of an online messaging platform for a user to communicate by way of electronic messaging with one or more other users. The launching of the online messaging platform is in response to a user selecting text. The computer-implemented method also includes adding one or more additional users to the online messaging platform, when the user tags the one or more additional users. The computer-implemented method further includes facilitating exchange of electronic messaging, via the online messaging platform, between the user and the one or more additional users in regard to the selected text.

In another embodiment, an apparatus includes at least one processor and memory, which includes a set of instructions configured to facilitate collaboration in context. The set of instructions, with the at least one processor, is configured to cause the apparatus to launch an online messaging platform for a user to communicate by way of electronic messaging with one or more other users. The launch of the online messaging platform is in response to a user selecting text. The set of instructions, with the at least one processor, is further configured to cause the apparatus to add one or more additional users to the online messaging platform, when the user tags the one or more additional users, and facilitate exchange of electronic messaging, via the online messaging platform, between the user and the one or more additional users in regard to the selected text.

In yet another embodiment, a computer program is embodied on a non-transitory computer readable medium. The computer program when executed is configured to cause at least one processor to launch an online messaging platform for a user to communicate by way of electronic messaging with one or more other users. The launching of the online messaging platform is in response to a user selecting text. The computer program when executed is further configured to cause at least one processor to add one or more additional users to the online messaging platform, when the user tags the one or more additional users. The computer program when executed is configured to cause at least one processor to facilitate exchange of electronic messaging, via the online messaging platform, between the user and the one or more additional users in regard to the selected text.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
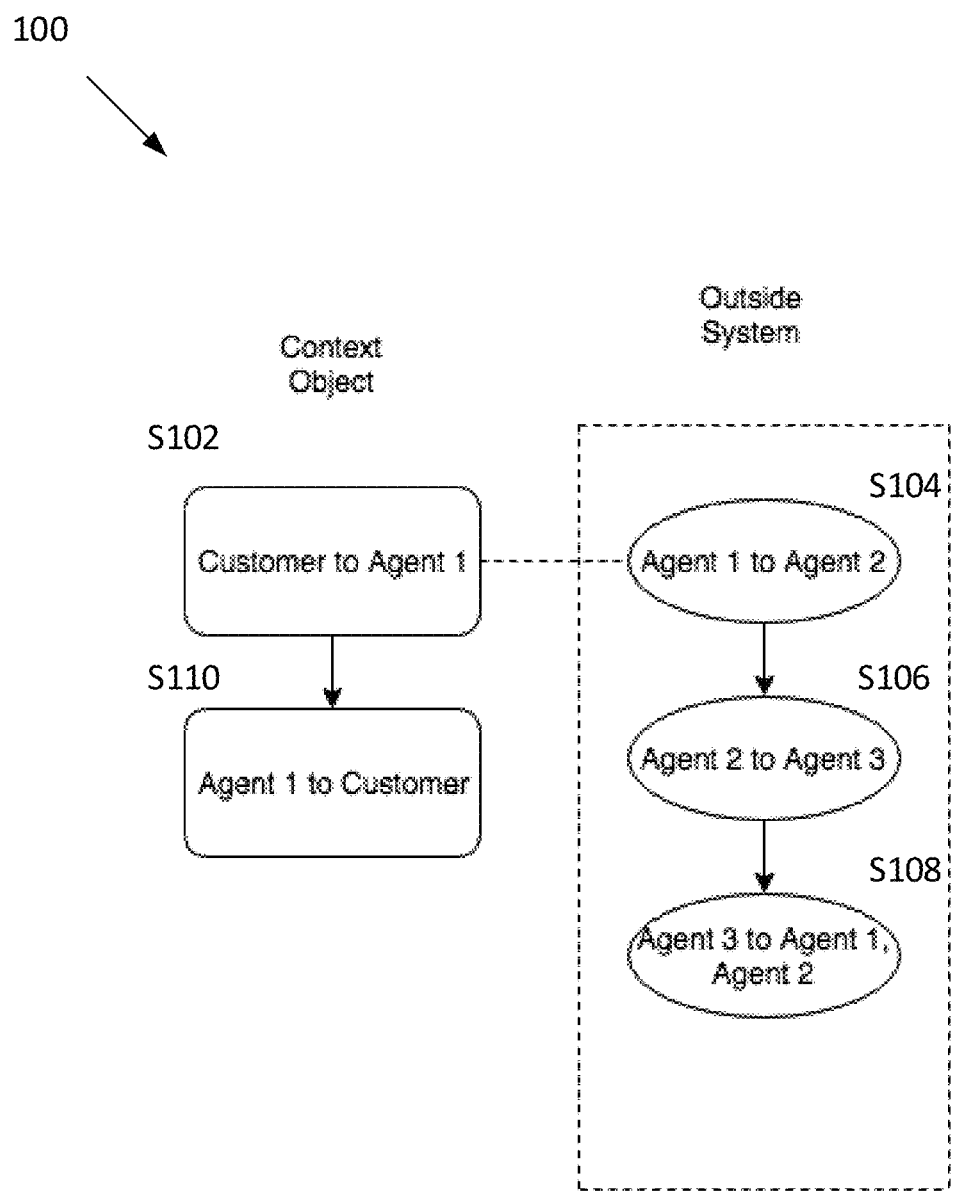
FIG. 1 is related art showing a flow diagram of a conventional online ticket management process.

Some embodiments pertain to an online messaging collaboration system (or platform). For example, the online messaging platform is launched for a user to communicate by way of electronic messaging with one or more other users. The online messaging platform is launched when a user selects text that requires further collaboration.

The following embodiments of an online messaging platform using an Internet-based helpdesk system are only for illustrative purposes only. It should be appreciated that the embodiments of the online messaging platform are not limited to an Internet-based helpdesk system. Specifically, the embodiments of the online messaging platform may be implemented across one or more Internet-based technologies.

Using the Internet-based helpdesk system as an example, when a ticket is received from a customer, an online ticket management system may assign the ticket to a primary agent. When the primary agent receives the ticket at his or her computing system, the contents of the ticket are displayed. In scenarios where the primary agent requires further assistance with ticket resolution, the primary agent may collaborate with one or more secondary (or additional) agents via electronic communication such that each agent may have access to the ticket and communicate with one another.

In those scenarios, the text within the ticket is highlighted by the primary agent. See, for example, FIG. 8. The highlighting of the text may trigger a chat window, which may be automatically launched in some embodiments. The chat window may appear next to the highlighted text, allowing for real-time changes to occur. In other embodiments, a discussion button may appear near the highlighted text, and when the discussion button is clicked, the chat window appears. Either embodiment allows the primary agent to begin the communication process with one or more secondary agents regarding the highlighted text within the ticket.

Embodiments where the discussion button is shown or populated, the discussion button, when selected, is configured to launch the chat window for an internal discussion between the primary agent and one or more secondary agents. The chat window (or online messaging platform) allows the primary agent to begin discussing ticket resolution with one or more secondary agents, and more particularly, discuss a specific issue associated with the ticket with the one or more secondary agents.

In some embodiments, the online messaging platform may include a ticket (or text) snippet and a dialogue box. The snippet is indicative of the ticket or the highlighted text within the ticket. This allows for the one or more secondary agents understand the purpose of the discussion. The dialogue box allows for the primary agent to insert the message that is to be sent to the one or more secondary agents.

Upon loading of the online messaging platform, one or more secondary agents are added. For example, to add one or more secondary agents or groups, the primary agent may tag one or more secondary agents or groups by using the following format: @username, @group name, etc. One of ordinary skill in the art would appreciate that other tagging techniques may also be used. Continuing with the tagging example, by using '@' symbol, a dialogue box with a complete listing of the one or more secondary agents may be displayed. This way, the primary agent may select the one or more secondary agents that he or she wishes to add to the internal discussion.

In some embodiments, one or more secondary agents may not be listed within the dialogue box. In those embodiments, the one or more secondary agents may need to be added to the list. In such embodiments, the dialogue box includes an option to add another secondary agent. The option allows the primary agent to enter the email address of the other secondary agent. Upon entering of the email address, a notification (or invite) is transmitted to the other secondary agent by way of email.

Once the one or more secondary agents are tagged, a notification is sent to the one or more secondary agents. The notification may be in the form of a text messaging, an email, etc., and may include a link to the chat in some embodiments. When the one or more secondary agents clicks on the link, the chat window is displayed on the one or more secondary agents' computing system.

It should be appreciated that the primary agent may add additional secondary agents at any point in the internal discussion by way of tagging, for example. Also, one or more additional groups, such as technical support, may be included within the internal discussion by way of tagging. For example, when the one or more groups are added, the members within the tagged group receive a notification. The notification includes a link to the internal discussion, allowing the members within the group to select the link, thereby launching the chat. This is helpful when the primary agent does not know who to tag within the group. By tagging the entire group, at least one of the members within the group can click on the link and begin communication with the primary agents.

It should also be noted that multiple internal discussion may be executed for multiple tickets. In those embodiments, a feed is displayed showing all active internal discussions. Further, for any new messages within the one or more active internal discussions, a new notification is sent to the primary agent. The notification may be sent via e-mail, feed, or any transmission medium.

In embodiments where there is an active discussion, when the primary agent moves the cursor over the highlighted text, the online messaging platform is launched, so the primary agent can continue his or her discussion with the one or more secondary agents. It should be noted that these functionalities are not limited to the primary agent's computing system but may also apply to the secondary agents' computing system.

Figure 2:
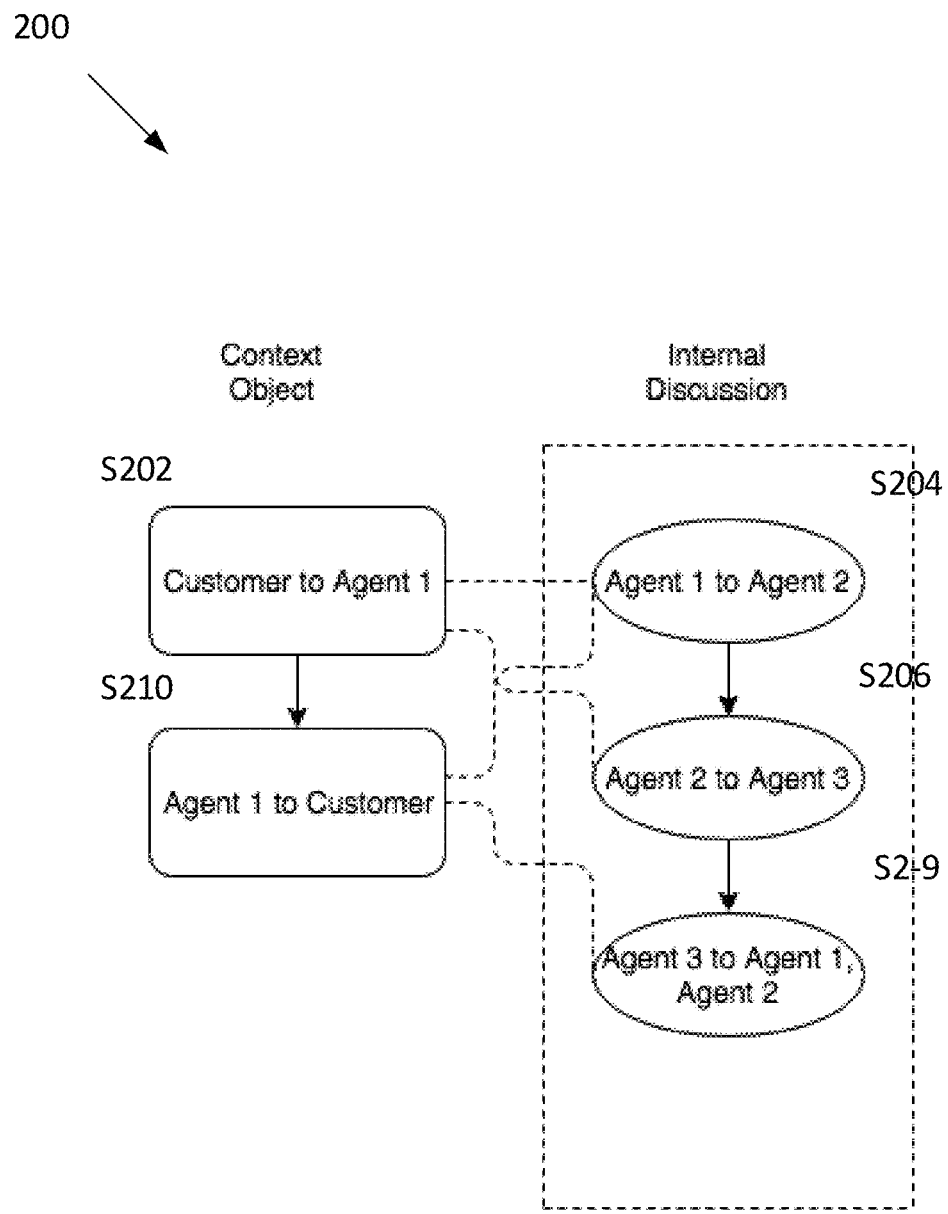
FIG. 2 is a flow diagram illustrating communication within an online message collaboration system, according to an embodiment of the present invention.

FIG. 2 is a flow diagram illustrating communication within an online message collaboration system 200, according to an embodiment of the present invention. Similar to FIG. 1, Customer may communicate (S202) with Agent 1 by way of a ticket. That being said, when Agent 1 requires further assistance, and when subsequent agents (Agents 2 and 3) are added to the ticket, each agent has access to the ticket. For example, regardless of the communication (S204, S206, S208, S210), each agent may have access to the internal discussion for that particular ticket. This way, the agents all have most up to date information related to any discussion.

Figure 3:
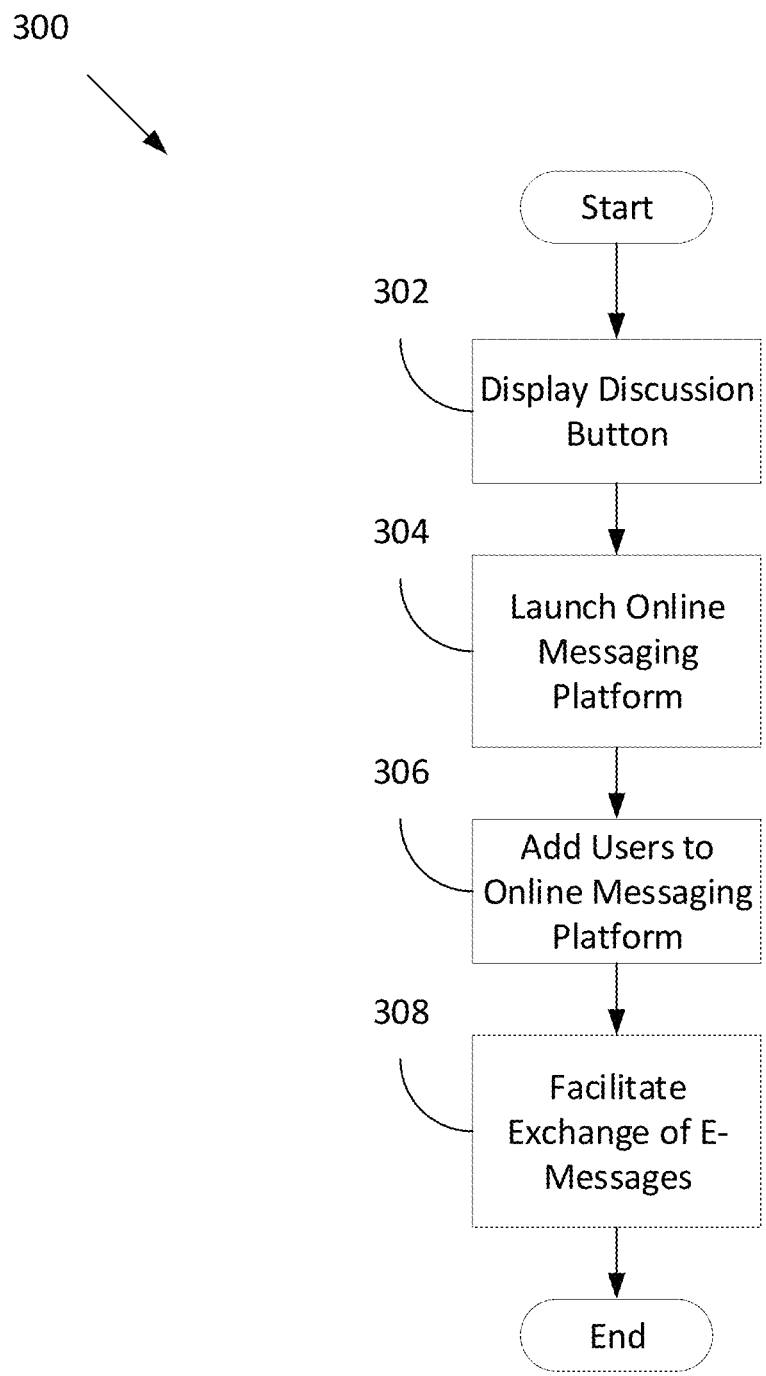
FIG. 3 is a flow diagram illustrating a process for launching an online messaging platform to facilitate communication (or collaboration in context) between multiple users, according to an embodiment of the present invention.

FIG. 3 is a flow diagram illustrating a process 300 for launching an online messaging platform to facilitate collaboration in context between multiple users, according to an embodiment of the present invention. Process 300 may be executed by computing system 700 of FIG. 7, for example. In some embodiments, process 300 may begin at 302 with the computing system displaying a discussion button for the user to select when a user selects (or highlights) text. At 304, the computing system launches the online messaging platform in response to the user clicking on the discussion button. In another embodiment, the computing system automatically launches the online messaging platform when the user selects the text. The online messaging platform facilitates joint collaboration between the user and other users by way of electronic messaging in regard to the selected text. Further, the online messaging platform may be displayed near the selected text to provide context of the discussion.

At 306, the computing system adds one or more additional users to the online messaging platform, when the user tags the one or more additional users. At 308, the computing system facilitates the exchange of electronic messaging, via the online messaging platform, between the user and the one or more additional users regarding the selected text. Each user using the online messaging platform may have access (and may view) the selected text. This access provides the user with context when collaborating (or communicating) with other users by way of the online messaging platform. More specifically, in certain embodiments, the online messaging platform includes a snippet of the selected text, one or more posted messages by the user or the one or more additional users, and a dialogue box for the user to insert text, to add users, etc.

Figure 4:
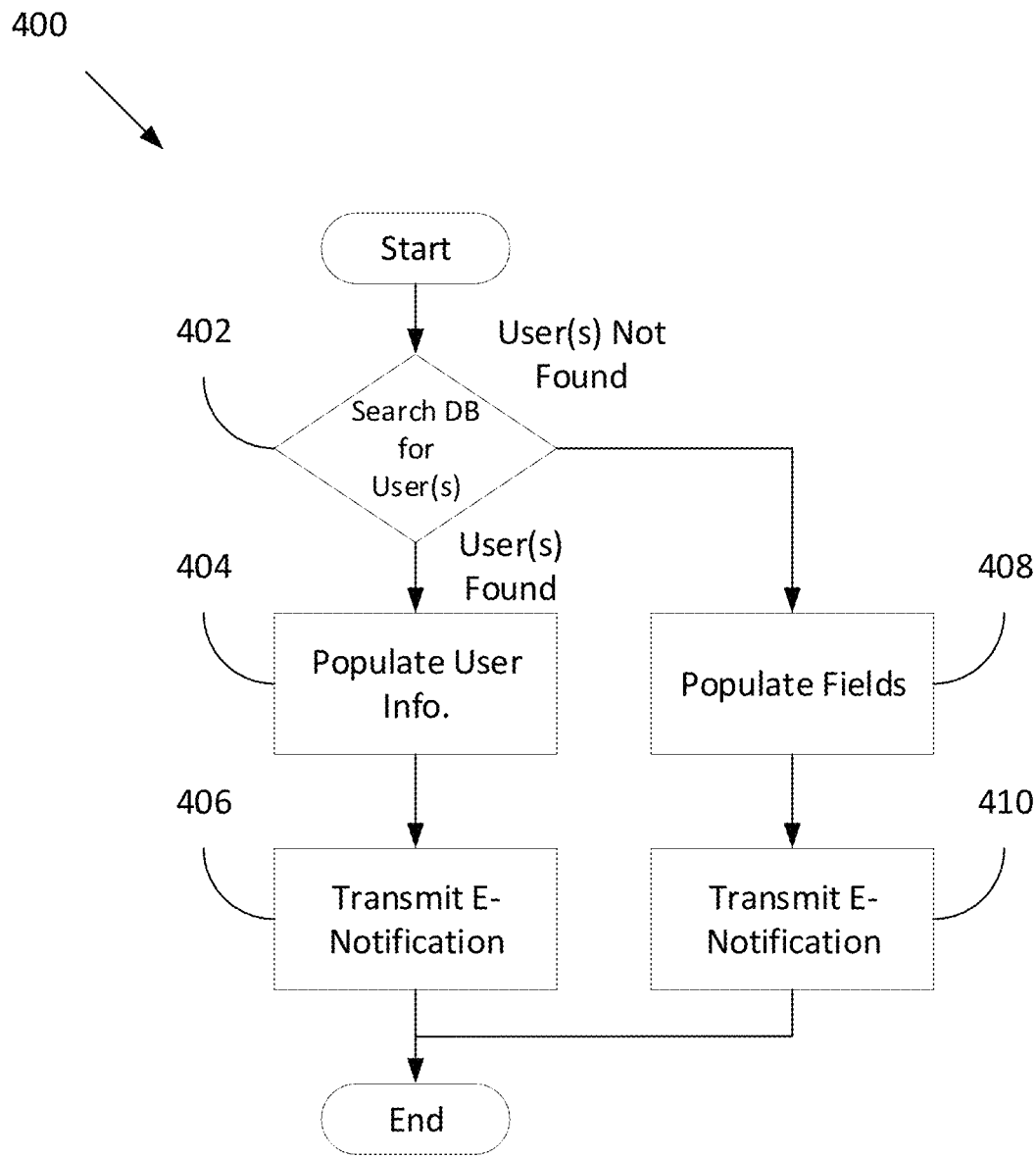
FIG. 4 is a flow diagram illustrating a process for adding one or more additional users to the online messaging platform, according to an embodiment of the present invention.

FIG. 4 is a flow diagram illustrating a process 400 for adding one or more additional users to the online messaging platform in regard to the selected text, according to an embodiment of the present invention. Process 400 may be executed by computing system 700 of FIG. 7, for example. In some embodiments, process 400 may begin at 402 with the computing system searching a database for information associated with the one or more additional users, when a user tags the one or more additional users in a dialogue box. For example, the user may enter the one or more additional users tag ('@' symbol plus the name) within the dialogue box. This prompts the computing system to search for the one or more additional users associated with the tag. In some embodiments, the email address of the one or more additional users is entered, prompting the computing system to search for the one or more additional users. It should be appreciated that the database may include a tag identifying the one or more additional users, an email address associated with the one or more additional users, or any other information that identifies the one or more additional users.

At 404, the computing system populates information associated with the one or more additional users when the information associated with the one or more additional users is found in the database. The information may be populated in a separate popup window, for example. At 406, the computing system transmits an electronic notification (e.g., email notification) to the one or more additional users when the user clicks on the information associated with the one or more additional users. In some embodiments, the notification includes a hyperlink to launch an online messaging platform for the one or more additional users.

If, however, the information associated with the one or more additional users is not found within the database, the computing system at 408 populates an email field and tag field for the user to complete. The email field and tag field may be populated in a separate window, for example. At 410, the computing system, upon insertion of an email address in the email field and a tag in the tag field, transmits a notification to the one or more additional users. The notification in some embodiments, includes a hyperlink to launch an online messaging platform for the one or more additional users. It should be appreciated that the computing system also stores the email address and the tag associated with the one or more additional users within the database for future use. This way, if the one or more additional users have to been added to another discussion, the information for the one or more additional users is readily available.

Figure 5:
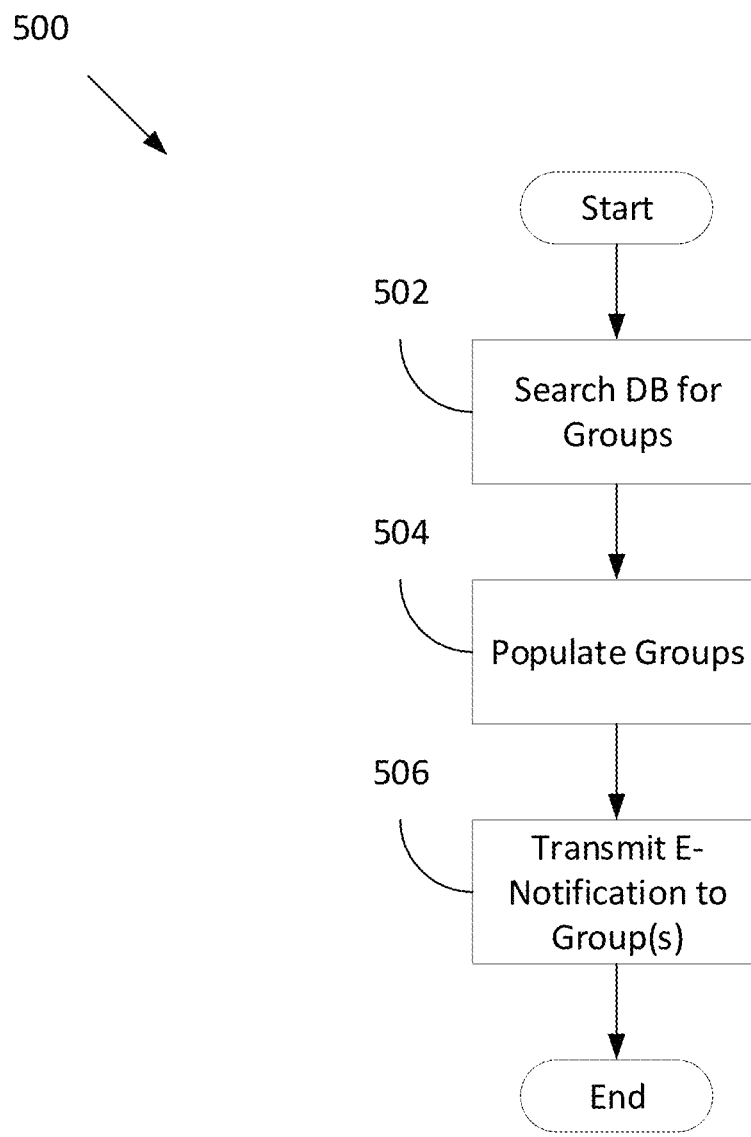
FIG. 5 is a flow diagram illustrating a process for adding of one or more additional users from a group of users, according to an embodiment of the present invention.

FIG. 5 is a flow diagram illustrating a process 500 for adding of one or more additional users from a group of users, according to an embodiment of the present invention. Process 500 may be executed by computing system 700 of FIG. 7, for example. In some embodiments, process 500 may begin at 502 with the computing system searching a database for information associated with the one or more additional groups. The searching of the database begins when the user tags the one or more additional groups in a dialogue box. At 504, the computing system populates information associated with the one or more additional groups in a pop-up window, allowing the user to select the group that should be added. At 506, the computing system transmits an electronic notification to one or more members within the one or more additional groups, when the user selects the information associated with the one or more additional groups. The notification in some embodiments includes a hyperlink to launch an online messaging platform for the one or more members.

Figure 6:
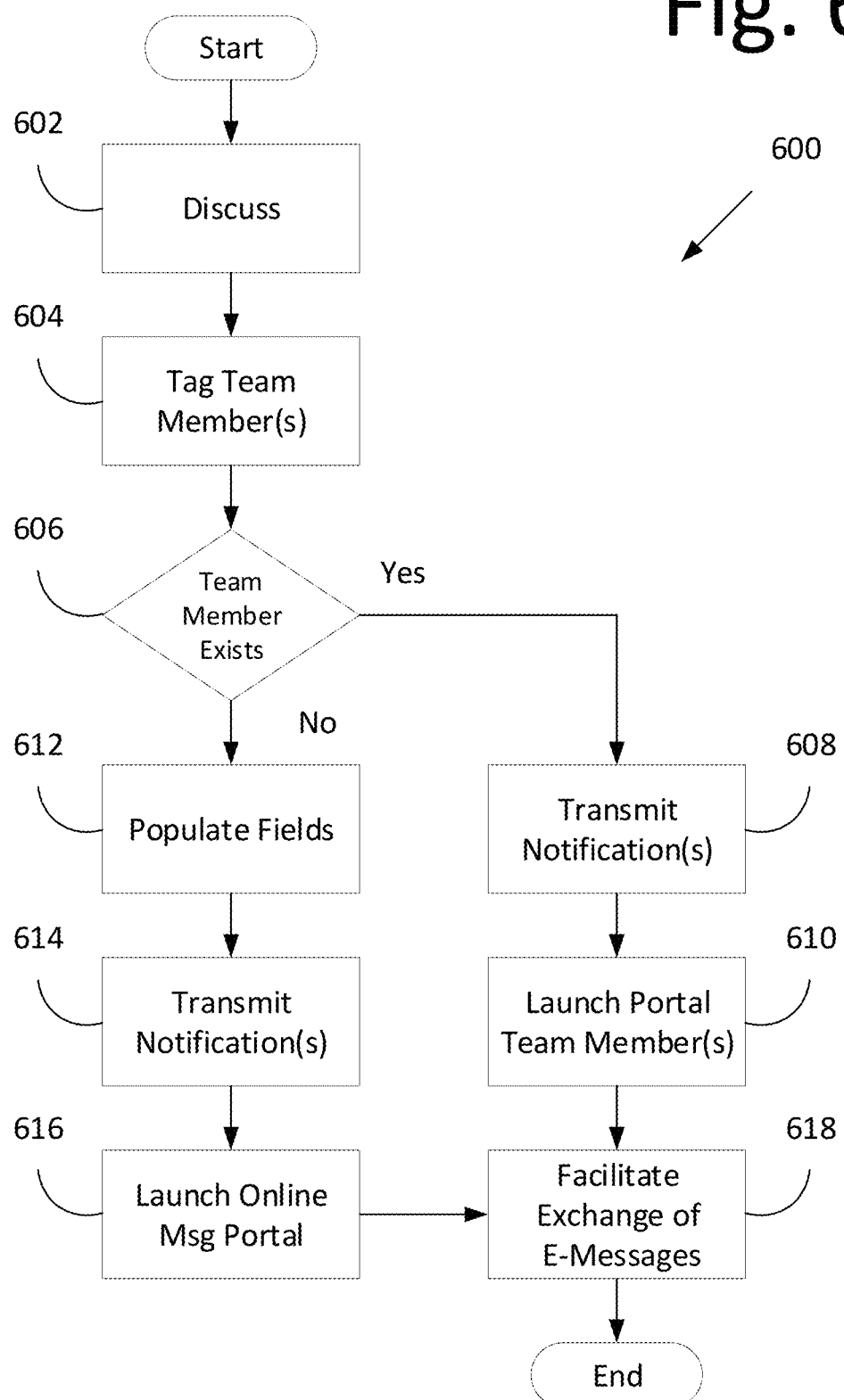
FIG. 6 is a flow diagram illustrating a process for launching, and collaborating within, an online messaging platform, according to an embodiment of the present invention.

FIG. 6 is a flow diagram illustrating a process 600 for launching, and collaborating within, an online messaging platform, according to an embodiment of the present invention. Process 600 may be executed by one or more computing systems, such as that shown in FIG. 7, for example. In some embodiments, process 600 may begin at 602 with a user selecting text and clicking on the discussion button within a graphical user interface. At 604, the user tags a team member, e.g., by entering the tag of the team member within the graphical user interface. At 606, a server receives the tag, and searches for the tag and the associated information within a database. If the tag is found, the server sends a notification (or an email) to the team member affiliated with the tag at 608, and at 610, launches the online messaging platform for the team member, when the team member clicks on the link for the online messaging platform embedded within the email.

That being said, if the server cannot find the tag, the server at 612 populates an entry field within the online messaging platform for the user to enter the email of the team member. In some embodiments, the email may be converted into a tag. At 614, the server transmits a notification containing the link to the online messaging platform, and at 616, launches the online messaging platform for the team member, when the team member clicks on the link for the online messaging platform. At 618, the server facilitates the exchange of electronic messages in regard to the selected text by way of the online messaging platform, which is displayed on the user's computing device and the team member's computing device.

In some embodiments, the online messaging platform may be a standalone application, an application embedded within another application, a web-based application, an application downloaded to the computing device of the user and/or team member, or any combination thereof.

Figure 7:
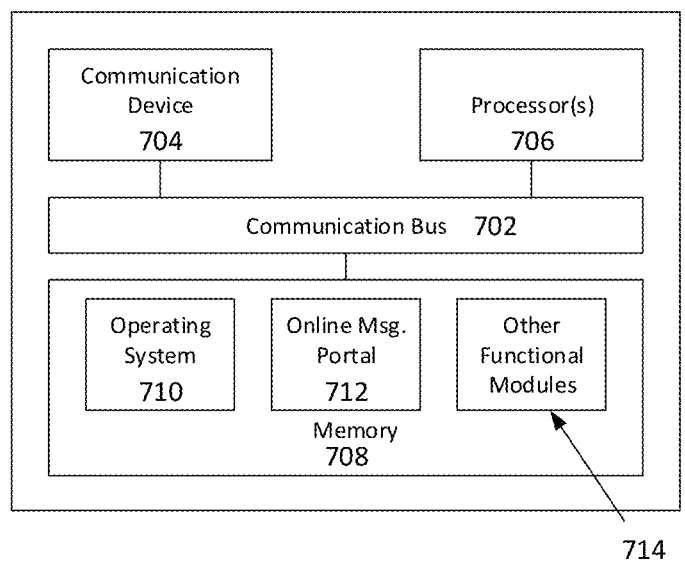
FIG. 7 is a block diagram illustrating a computing system for launching and facilitating collaboration within an online messaging platform, according to an embodiment of the present invention.

FIG. 7 is a block diagram illustrating a computing system 700, according to one embodiment of the present invention. Computing system 700 may include a bus 702 or other communication mechanism configured to communicate information, and at least one processor 706, coupled to bus 702, configured to process information. At least one processor 706 can be any type of general or specific purpose processor. Computing system 700 may also include memory 708 configured to store information and instructions to be executed by at least one processor 706. Memory 708 can be comprised of any combination of random access memory ("RAM"), read only memory ("ROM"), static storage such as a magnetic or optical disk, or any other type of computer readable medium. Computing system 700 may also include a communication device 704, such as a network interface card, configured to provide access to a network.

The computer readable medium may be any available media that can be accessed by at least one processor 706. The computer readable medium may include both volatile and nonvolatile medium, removable and non-removable media, and communication media. The communication media may include computer readable instructions, data structures, program modules, or other data and may include any information delivery media.

According to one embodiment, memory 708 may store software modules that may provide functionality when executed by at least one processor 706. The modules can include an operating system 710 and an online messaging platform module 712 for executing a context with linked discussions. Operating system 710 may provide operating system functionality for computing system 700. Because computing system 700 may be part of a larger system, computing system 700 include one or more additional functional modules 714 to include the additional functionality for executing various functions of the online messaging platform module 712.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

The process shown in FIGS. 3-6 may be performed, in part, by a computer program, encoding instructions for a nonlinear adaptive processor to cause at least the process described in FIGS. 3-6 to be performed by the apparatuses discussed herein. The computer program may be embodied on a non-transitory computer readable medium. The computer readable medium may be, but is not limited to, a hard disk drive, a flash device, a random-access memory, a tape, or any other such medium used to store data. The computer program may include encoded instructions for controlling the nonlinear adaptive processor to implement the process described in FIGS. 3-6, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general-purpose computer, or an application specific integrated circuit ("ASIC").

Figure 8:
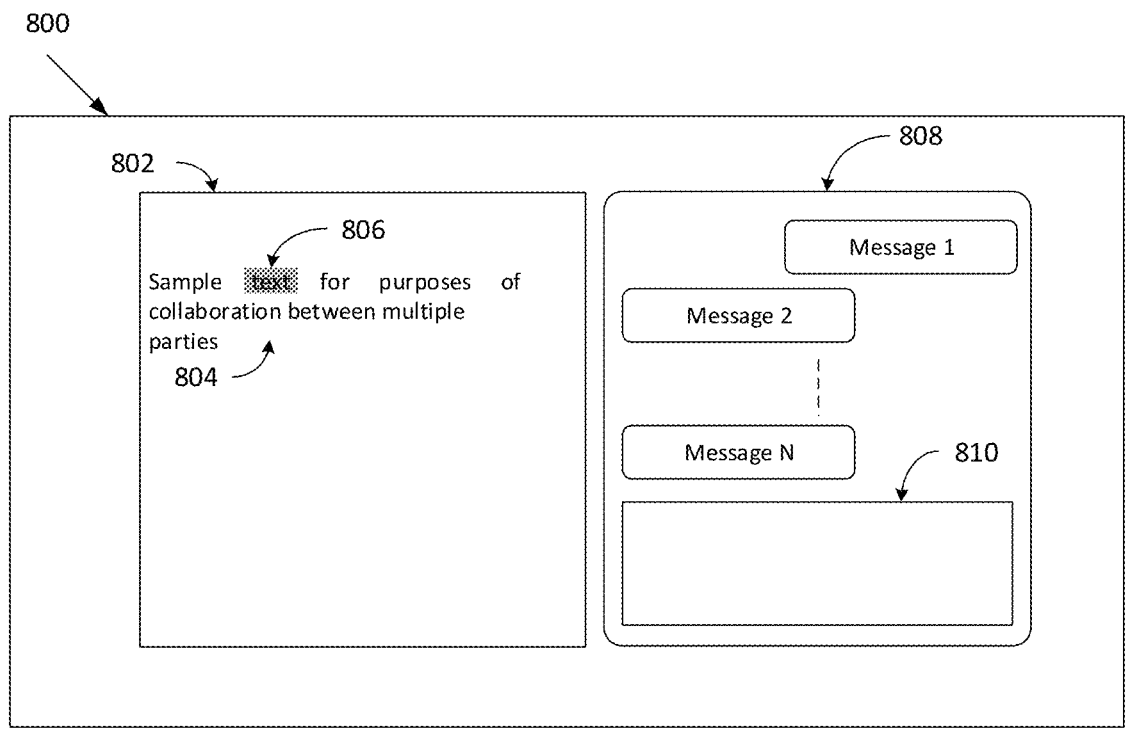
FIG. 8 is a graphical user interface illustrating an online messaging platform configured to facilitate joint collaboration between multiple user devices, according to an embodiment of the present invention.

FIG. 8 is a graphical user interface 800 illustrating an online messaging platform configured to facilitate joint collaboration between multiple user devices, according to an embodiment of the present invention. In this embodiment, graphical user interface 800 includes a section 802 allowing a user to view or enter content 804 such as text, audio, and/or video. To collaborate with other users, the user may highlight text as shown in item 806.

Graphical user interface 800 shows an online messaging platform 808 configured to facilitate the exchange of electronic message between multiple parties. Online messaging platform 808 includes a text insertion section 810 configured to allow a user to type content. In text insertion section 810, the user may tag other users or groups of users.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
receiving a ticket from an Internet-based helpdesk system, the ticket is associated with an Internet-based inquiry or request from a customer;
automatically launching an online messaging platform for a customer-facing agent to communicate by way of electronic messaging with one or more additional non-customer-facing agents not associated with the ticket, wherein
the launching of the online messaging platform comprises
launching of the online messaging platform in response to the customer-facing agent selecting text within the ticket, and
excluding the customer from the online messaging platform when the online messaging platform is launched;
displaying the online messaging platform next or adjacent to the selected text to provide context of a discussion between the customer-facing agent and the one or more additional non-customer facing agents with respect to the selected text;
adding the one or more additional non-customer-facing agents to the online messaging platform, wherein
the adding of the one or more additional non-customer-facing agents comprises
receiving a tag entered by the customer-facing agent for each of the one or more additional non-customer-facing agents to be added to the online messaging platform, the tag comprising an @ symbol followed by a username or a group name, and
providing each of the one or more additional non-customer-facing agents access to the ticket so that contents of the ticket is visible to the one or more additional non-customer-facing agents, and wherein
the adding of one or more additional non-customer-facing agents further comprises
when the customer-facing agent tags the one or more additional non-customer-facing agents in a dialogue box, searching a database for information associated with the one or more additional non-customer-facing agents; and exchanging electronic messaging, via the online messaging platform, between the customer-facing agent and the one or more additional non-customer-facing agents in regard to the selected text within the ticket while excluding the customer from the online messaging platform.

2. The computer implemented method of claim 1, wherein the online messaging platform comprises the selected text or other text related to the selected text, one or more posted messages, and a dialogue box for the customer-facing agent to insert text.

3. The computer-implemented method of claim 1, wherein the launching of the online messaging platform further comprises
in response to the selected text, displaying a discussion button for the customer-facing agent to select, and
in response to the customer-facing agent clicking on the discussion button, launching the online messaging platform.

4. The computer-implemented method of claim 1, wherein the adding of the one or more additional non-customer-facing agents comprises
populating the information associated with the one or more additional non-customer-facing agents when the information associated with the one or more additional non-customer-facing agents is found in the database, and
transmitting an electronic notification to the one or more additional non-customer-facing agents upon the customer-facing agent selecting the information associated with the one or more additional non-customer-facing agents, wherein the notification comprises a hyperlink to launch an online messaging platform for the one or more additional non-customer-facing agents.

5. The computer-implemented method of claim 4, wherein the adding of the one or more additional non-customer-facing agents comprises
populating an email field and a tag field for the customer-facing agent to complete when the information associated with the one or more additional non-customer-facing agents is not found within the database, and
upon insertion of an email address in the email field and the tag in the tag field, transmitting a notification to the one or more additional non-customer-facing agents, wherein the notification comprises a hyperlink to launch an online messaging platform for the one or more additional non-customer-facing agents.

6. The computer-implemented method of claim 1, wherein the adding of one or more additional non-customer-facing agents comprises
when the customer-facing agent tags one or more additional groups in a dialogue box, searching a database for information associated with the one or more additional groups.

7. The computer-implemented method of claim 6, wherein the adding of the one or more additional non-customer-facing agents comprises
populating the information associated with the one or more additional groups, and
transmitting an electronic notification to one or more members within the one or more additional groups, upon the customer-facing agent selecting the information associated with the one or more additional groups, wherein the notification comprises a hyperlink to launch an online messaging platform for the one or more members within the one or more additional groups.

8. An apparatus, comprising:
at least one processor; and
memory comprising a set of instructions for facilitating collaboration in context,
wherein the set of instructions, with the at least one processor, is configured to cause the apparatus to
receive a ticket from an Internet-based helpdesk system, the ticket is associated with an Internet-based inquiry or request from a customer;
automatically launch an online messaging platform for a customer-facing agent to communicate by way of electronic messaging with one or more additional non-customer-facing agents, wherein
the launching of the online messaging platform comprises
launch the online messaging platform in response to the customer-facing agent selecting text within the ticket, and
exclude the customer from the online messaging platform when the online messaging platform is launched;
display the online messaging platform next or adjacent to the selected text to provide context of a discussion between the customer-facing agent and the one or more additional non-customer facing agents with respect to the selected text;
add the one or more additional non-customer-facing agents to the online messaging platform, wherein
the addition of the one or more additional non-customer-facing agents comprises
receive a tag entered by the customer-facing agent for each of the one or more additional non-customer-facing agents to be added to the online messaging platform, the tag comprising an @ symbol followed by a username or a group name, and
provide each of the one or more additional non-customer-facing agents access to the ticket so that contents of the ticket is visible to the one or more additional non-customer-facing agents, and wherein
the addition of one or more additional non-customer-facing agents further comprises
when the customer-facing agent tags the one or more additional non-customer-facing agents in a dialogue box, searching a database for information associated with the one or more additional non-customer-facing agents; and
exchange electronic messaging, via the online messaging platform, between the customer-facing agent and the one or more additional non-customer-facing agents in regard to the selected text within the ticket while excluding the customer from the online messaging platform.

9. The apparatus of claim 8, wherein the online messaging platform comprises the selected text or other text related to the selected text, one or more posted messages, and a dialogue box for the customer-facing agent to insert text.

10. The apparatus of claim 8, wherein the set of instructions, with the at least one processor, is further configured to cause the apparatus to
in response to the selected text, display a discussion button for the customer-facing agent to select, and
in response to the customer-facing agent clicking on the discussion button, launch the online messaging platform.

11. The apparatus of claim 8, wherein the set of instructions, with the at least one processor, is further configured to cause the apparatus to
populate the information associated with the one or more additional non-customer-facing agents when the information associated with the one or more additional non-customer-facing agents is found in the database, and
transmit an electronic notification to the one or more additional non-customer-facing agents upon the customer-facing agent selecting the information associated with the one or more additional users, wherein the notification comprises a hyperlink to launch an online messaging platform for the one or more additional users.

12. The apparatus of claim 8, wherein the set of instructions, with the at least one processor, is further configured to cause the apparatus to
populate an email field and tag field for the customer-facing agent to complete when the information associated with the one or more additional non-customer-facing agents is not found within the database, and
upon insertion of an email address in the email field and the tag in the tag field, transmit a notification to the one or more additional non-customer-facing agents, wherein the notification comprises a hyperlink to launch an online messaging platform for the one or more additional non-customer-facing agents.

13. The apparatus of claim 8, wherein the set of instructions, with the at least one processor, is further configured to cause the apparatus to search a database for information associated with one or more additional groups, when the customer-facing agent tags the one or more additional groups in a dialogue box.

14. The apparatus of claim 13, wherein the set of instructions, with the at least one processor, is further configured to cause the apparatus to
populate the information associated with the one or more additional groups, and
transmit an electronic notification to one or more members within the one or more additional groups, upon the customer-facing agent selecting the information associated with the one or more additional groups, wherein the notification comprises a hyperlink to launch an online messaging platform for the one or more members within the one or more additional groups.

15. A computer program embodied on a non-transitory computer readable medium, the computer program when executed is configured to cause at least one processor to
receive a ticket from an Internet-based helpdesk system, the ticket is associated with an Internet-based inquiry or request from a customer;
automatically launch an online messaging platform for a customer-facing agent to communicate by way of electronic messaging with one or more non-customer-facing agents, wherein the launching of the online messaging platform comprises
launch of the online messaging platform in response to the customer-facing agent selecting text within the ticket, and
exclude the customer from the online messaging platform when the online messaging platform is launched;
display the online messaging platform next or adjacent to the selected text to provide context of a discussion between the customer-facing agent and the one or more additional non-customer facing agents with respect to the selected text;
add the one or more additional non-customer-facing agents to the online messaging platform, wherein
the addition of the one or more additional non-customer-facing agents comprises
receive a tag entered by the customer-facing agent for each of the one or more additional non-customer-facing agents to be added to the online messaging platform, the tag comprising an @ symbol followed by a username or a group name, and
provide each of the one or more additional non-customer-facing agents access to the ticket so that contents of the ticket is visible to the one or more additional non-customer-facing agents, and
the addition of one or more additional non-customer-facing agents further comprises
when the customer-facing agent tags the one or more additional non-customer-facing agents in a dialogue box, searching a database for information associated with the one or more additional non-customer-facing agents; and
exchange electronic messaging, via the online messaging platform, between the customer-facing agent and the one or more additional non-customer-facing agents in regard to the selected text within the ticket while excluding the customer from the online messaging platform.

16. The computer program of claim 15, wherein the online messaging platform comprises the selected text or other text related to the selected text, one or more posted messages, and a dialogue box for the customer-facing agent to insert text.

17. The computer program of claim 15, wherein the computer program when executed is further configured to cause at least one processor to
in response to the selected text, display a discussion button for the customer-facing agent to select, and
in response to the customer-facing agent clicking on the discussion button, launch the online messaging platform.

18. The computer program of claim 15, wherein the computer program when executed is further configured to cause at least one processor to
populate the information associated with the one or more additional non-customer-facing agents when the information associated with the one or more additional non-customer-facing agents is found in the database, and
transmit an electronic notification to the one or more additional non-customer-facing agents upon the customer-facing agent selecting the information associated with the one or more additional non-customer-facing agents, wherein the notification comprises a hyperlink to launch an online messaging platform for the one or more additional non-customer-facing agents.

19. The computer program of claim 15, wherein the computer program when executed is further configured to cause at least one processor to
populate an email field and tag field for the customer-facing agent to complete when the information associated with the one or more additional non-customer-facing agents is not found within the database, and
upon insertion of an email address in the email field and the tag in the tag field, transmit a notification to the one or more additional non-customer-facing agents, wherein the notification comprises a hyperlink to launch an online messaging platform for the one or more additional non-customer-facing agents.

20. The computer program of claim 15, wherein the computer program when executed is further configured to cause at least one processor to search a database for information associated with one or more additional groups, when the customer-facing agent tags the one or more additional groups in a dialogue box.

21. The computer program of claim 20, wherein the computer program when executed is further configured to cause at least one processor to populate the information associated with the one or more additional groups, and transmit an electronic notification to one or more members within the one or more additional groups, upon the customer-facing agent selecting the information associated with the one or more additional groups, wherein the notification comprises a hyperlink to launch an online messaging platform for the one or more members within the one or more additional groups.

* * * * *